United States Patent
Nolcheff et al.

(10) Patent No.: US 10,294,965 B2
(45) Date of Patent: May 21, 2019

(54) COMPRESSION SYSTEM FOR A TURBINE ENGINE

(71) Applicant: HONEYWELL INTERNATIONAL INC., Morris Plains, NJ (US)

(72) Inventors: Nick Nolcheff, Chandler, AZ (US); Michael LaMar Trego, Mesa, AZ (US); John Repp, Gilbert, AZ (US); James Kroeger, Tempe, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 409 days.

(21) Appl. No.: 15/163,990

(22) Filed: May 25, 2016

(65) Prior Publication Data
US 2017/0343015 A1    Nov. 30, 2017

(51) Int. Cl.
| | |
|---|---|
| *F01D 5/16* | (2006.01) |
| *F01D 5/34* | (2006.01) |
| *F02C 3/08* | (2006.01) |
| *F04D 17/02* | (2006.01) |
| *F04D 19/00* | (2006.01) |

(Continued)

(52) U.S. Cl.
CPC ............ *F04D 29/668* (2013.01); *F01D 5/16* (2013.01); *F01D 5/34* (2013.01); *F02C 3/08* (2013.01); *F04D 17/025* (2013.01); *F04D 19/002* (2013.01); *F04D 19/02* (2013.01); *F04D 29/321* (2013.01); *F04D 29/325* (2013.01); *F04D 29/328* (2013.01); *F04D 29/38* (2013.01); *F04D 29/666* (2013.01); *F05D 2220/30* (2013.01); *F05D 2220/36* (2013.01); *F05D 2260/96* (2013.01); *Y02T 50/671* (2013.01); *Y02T 50/673* (2013.01)

(58) Field of Classification Search
CPC . F02C 3/08; F01D 5/34; F01D 5/3061; Y10T 29/49325; F05D 2220/3219; F05D 2220/26; F04D 17/025
See application file for complete search history.

(56) References Cited

U.S. PATENT DOCUMENTS

| | | | | |
|---|---|---|---|---|
| 3,834,157 | A * | 9/1974 | Hoffmann | ............... F01D 25/02 165/87 |
| 3,905,191 | A * | 9/1975 | Matto | .................. F04D 29/441 60/39.092 |

(Continued)

OTHER PUBLICATIONS

Rauch, Dale. Design Study of an Air Pump and Integral Lift Engine ALF-504 Using the Lycoming 502 Core. NASA: 1972. Retrieved from https://ntrs.nasa.gov/archive/nasa/casi.ntrs.nasa.gov/19730004744.pdf.*

(Continued)

*Primary Examiner* — Igor Kershteyn
*Assistant Examiner* — Topaz L. Elliott
(74) *Attorney, Agent, or Firm* — Lorenz & Kopf, LLP (57) ABSTRACT

A blisk fan is provided for a turbine engine propulsion system. The blisk fan includes a hub configured to rotate about a rotational axis at a maximum rotational speed, and a plurality of blades extending radially outward from the hub to define a fan leading edge tip diameter. Each of the blades has a first vibratory mode at a natural frequency, which is greater than a first fan order and less than a second fan order at the maximum rotational speed. The compression system preferably has a balance factor of the compression system between 1.9 and 3.2.

20 Claims, 3 Drawing Sheets

(51) Int. Cl.
*F04D 19/02* (2006.01)
*F04D 29/32* (2006.01)
*F04D 29/38* (2006.01)
*F04D 29/66* (2006.01)

(56) References Cited

U.S. PATENT DOCUMENTS

| | | | |
|---|---|---|---|
| 4,076,455 A | 2/1978 | Stargardter | |
| 5,947,688 A | 9/1999 | Schilling et al. | |
| 6,000,906 A * | 12/1999 | Draskovich | F01D 5/3084 |
| | | | 415/189 |
| 6,471,482 B2 * | 10/2002 | Montgomery | F01D 5/10 |
| | | | 416/203 |
| 6,488,469 B1 * | 12/2002 | Youssef | F02C 3/08 |
| | | | 415/143 |
| 6,976,826 B2 * | 12/2005 | Roy | F01D 5/141 |
| | | | 416/1 |
| 7,334,997 B2 | 2/2008 | Karafillis | |
| 7,547,186 B2 * | 6/2009 | Schuster | F01D 5/141 |
| | | | 415/119 |
| 9,234,435 B2 * | 1/2016 | Ayers | F01D 11/22 |
| 9,303,589 B2 * | 4/2016 | Heikurinen | F04D 29/023 |
| 2002/0064458 A1 | 5/2002 | Montgomery et al. | |
| 2012/0244008 A1 | 9/2012 | Chang et al. | |
| 2014/0102200 A1 | 4/2014 | Singh et al. | |
| 2015/0198174 A1 | 7/2015 | Houle | |
| 2015/0233390 A1 | 8/2015 | White | |
| 2015/0292337 A1 | 10/2015 | Gentile et al. | |

OTHER PUBLICATIONS

Rao, J.S.; Mistuning of Bladed Disk Assemblies to Mitigate Resonance; Advances in Vibration Engineering, 5(1) 2006.

Wrong, C.B.; An Introduction to the JT15D Engine; an ASME publication; Mar. 1969.

McGee, O.G. et al.; A Reduced-Order Meshless Energy Model for the Vibrations of Mistuned Bladed Disks—Part 1: Theoretical Basis; Journal of Turbomachinery, Nov. 2013, vol. 135.

Extended EP Search Report for Application No. 17168899.7-1607 dated Oct. 17, 2017.

* cited by examiner

COMPRESSION SYSTEM FOR A TURBINE ENGINE

TECHNICAL FIELD

The present disclosure generally relates to a gas turbine system, and more particularly relates to a bladed disk or blisk fan for lower power propulsion systems (e.g., less than 15 klbf Sea-Level Takeoff Thrust) typically used in regional and business aviation applications as well as in other turbofan, turbojet, turboshaft, turboprop and rotorcraft applications.

BACKGROUND

Gas turbine propulsion systems for aircraft must deliver high performance in a compact, lightweight configuration. This is particularly important in lower power propulsion systems. In these applications, it is advantageous to utilize "axi-centrifugal" compressors, which includes one or more axial compressor stages followed by a centrifugal stage. While all-axial compressors may be developed for smaller engines, the last blade rows of the compressor have airfoils that are very small and, thus, highly sensitive to destabilizing features like the clearance gap between the blade tip and the outer case. The centrifugal stage of an axi-centrifugal compressor is less sensitive to these factors and, therefore, provides higher performance that is easier to retain. With an understanding of the benefit of using an axi-centrifugal compressor in these applications, it is important to evaluate modification of other components in the gas turbine propulsion system, such as the fan in combination with the axi-centrifugal compressor (i.e., the compression system).

In general, fans for aviation propulsion gas turbine engines must meet stringent durability criteria while delivering high performance and low weight at an acceptable cost to the commercial industry. Larger thrust engines inherently benefit from the larger size of the fan blades to meet bird and ice ingestion criteria of the Federal Aviation Administration. Larger thrust engines (i.e. greater than 15 klbf Sea-Level Takeoff (SLTO) thrust) also tend to exhibit increased bypass ratios and require less fan pressure rise which allows them to run at fan tip speeds as low as 1100 ft./sec and, thus further enhance their ability to meet these ingestion criteria.

The fan must be free of any aerodynamic or aero-elastic instability such as surge and flutter throughout the required operating regime. These requirements have historically driven aviation propulsion engines to one of two solutions. The first solution incorporates individual fan blades or airfoils mechanically inserted into a separate disk. Fans of this type typically have a fan blade thickness distribution resulting in a "1/rev" design, wherein the fundamental vibratory mode of the fan blade is above the first engine order at the fan maximum rotational speed. The interface between these airfoils and the disk introduces mechanical damping when the fan blades undergo movement relative to the disk, which tends to mitigate potential failure modes resulting from an aero-elastic instability known as flutter.

The second solution provides an integrally bladed disk fan also known as a blisk fan, which have blades integrally formed with or materially joined to a disk. For blisk fans, the distribution of fan blade thickness is modified to obtain a "2/rev" design or greater such that the fundamental vibratory mode of the fan blade is above the second engine order at the fan maximum rotational speed to address aeroelastic and aero-mechanical vibration and instability. By nature, a blisk fan is more prone to flutter because the fan blade is material joined to the rotor hub, thus reducing the inherent dampening in the fan. Increasing the fundamental modal frequency by increasing blade thickness in the airfoil region nearest the disk can significantly mitigate flutter even in a blisk fan. This thickness increase is often incorporated along with an increase in the chord of the blade, resulting in a decrease in aspect ratio. While this can be effective for reducing flutter, it often results in an unacceptable increase in weight. While the fan blades may be hollowed to reduce weight, the added cost associated with manufacture introduces an unacceptable increase in cost to the commercial industry.

Hence, there is a need for a simple and effective blisk fan configuration for use with an axi-centrifugal compressor in lower powered gas turbine propulsion systems, which meets certain performance requirements in a compact durable and cost-effective design.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A compression system including a blisk fan and an axi-centrifugal compressor is provided for a turbine engine propulsion system. The blisk fan includes a hub configured to rotate about a rotational axis at a maximum rotational speed, and a plurality of blades materially joined with the hub and extending radially outward from the hub to define a fan leading edge tip diameter. Each of the blades has a first vibratory mode at a natural frequency, which is greater than the rotational frequency of the fan, also known as the first fan order, or "1/rev," and less than twice the rotational frequency of the fan, also known as the second fan order, or "2/rev," at the maximum rotational speed. The axi-centrifugal compressor includes an axial compressor section having a compressor inlet and a centrifugal compressor section having a compressor outlet. The blisk fan directs pressurized fluid to the compressor inlet. A balance factor of the compression system, which is defined as the quotient of the fan leading edge tip diameter and an exit tip diameter of the centrifugal compressor, is between 1.9 and 3.2. The fan leading edge tip diameter may not be greater than 48 inches. Each blade may form an airfoil having an aspect ratio not less than 1.2. The hub may include an annular portion providing an airflow surface between the blades having hub slope that is not less than 20 degrees with respect to the rotational axis, enabling the higher fan pressure rise required by smaller thrust engines. Each blade intersects the hub at a proximal end and extends radially from an inner root to an outer tip at a distal end. The compression system may be configured such that a tangential tip speed of the outer tip is between about 1300 ft/sec and 1550 ft/sec at the maximum rotational speed.

A propulsion system is also provided that includes a turbine engine having an axi-centrifugal compressor disposed in an engine cowl and operably coupled to a shaft assembly for rotation about a rotational axis. A fan section is disposed in the engine cowl upstream of the turbine engine and operably coupled to the shaft assembly for drawing a fluid into the engine cowl. The fan section includes a blisk fan having a hub configured to rotate about a rotational axis at a maximum rotational speed, and a plurality of blades materially joined with the hub and extending radially outward from the hub to define a fan leading edge tip diameter.

Each of the blades has a first vibratory mode at a natural frequency, which is greater than a first fan order and less than a second fan order at the maximum rotational speed. The axi-centrifugal compressor includes an axial compressor section having a compressor inlet and a centrifugal compressor section having a compressor outlet. The blisk fan directs pressurized fluid to the compressor inlet. A balance factor of the compression system, which is defined as the quotient of the fan leading edge tip diameter and an exit tip diameter of the centrifugal compressor, is between 1.9 and 3.2. The fan leading edge tip diameter may not be greater than 48 inches. Each blade may form an airfoil having an aspect ratio not less than 1.2. The hub may include an annular portion providing an airflow surface between the blades having hub slope that is not less than 20 degrees with respect to the rotational axis, enabling the higher fan pressure rise required by smaller thrust engines. Each blade intersects the hub at a proximal end and extends radially from an inner root to an outer tip at a distal end. The propulsion system may be configured such that a tangential tip speed of the outer tip is between about 1300 ft/sec and 1550 ft/sec at the maximum rotational speed. The propulsion system may also be configured to generate not more than 15 klbf Sea-Level Takeoff Thrust.

Furthermore, other desirable features and characteristics of the system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention, which is defined by the claims. Furthermore, there is no intention to be bound by any expressed or implied theory presented in the preceding technical field, background, brief summary, or the following detailed description.

In general, it is to be appreciated that the following described embodiment is directed toward a blisk fan configured for use a gas turbine propulsion system typically used in regional and business aviation applications as well as in other turbofan, turbojet, turboshaft, turboprop and rotor-craft applications (e.g., less than 15 klbf Sea Level Take Off Thrust). However, one skilled in the art will recognize that the present disclosure may have utility in other applications, and as such is not limited to use in conjunction with a particular type of turbine engine or in a particular section or portion of a gas turbine engine.

Figure 1:
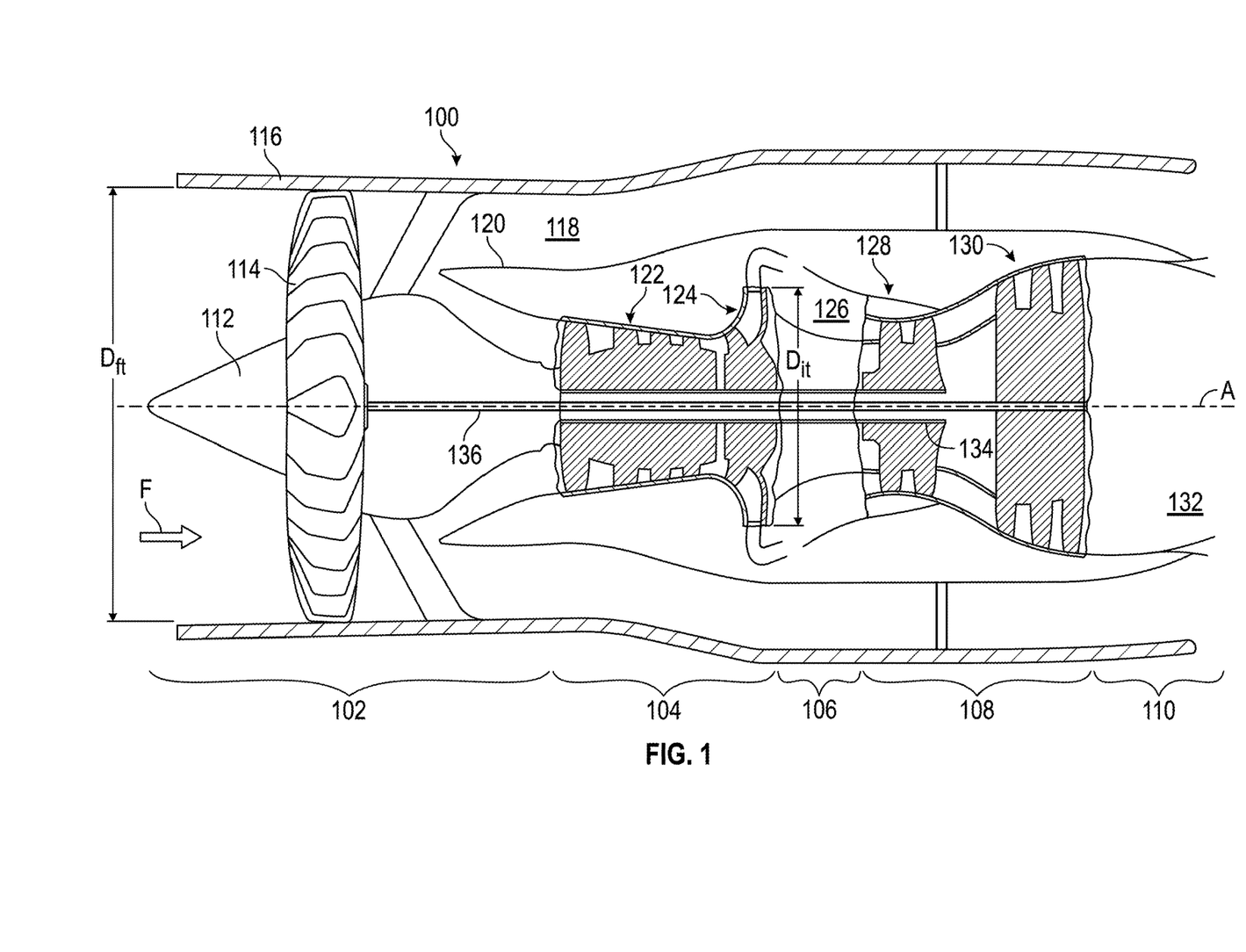
FIG. 1 is a simplified side cross sectional view of an exemplary multi-spool turbofan gas turbine jet engine.

With reference to FIG. 1, an exemplary embodiment of a gas turbine engine 100 includes an intake section 102, a compressor section 104, a combustion section 106, a turbine section 108, and an exhaust section 110. In the depicted embodiment, the intake section 102 includes a nose cone 112 and a fan 114, which is mounted in a fan case 116. Ambient fluid F from around the engine 100, generally in the form of air, is drawn by the fan 114 over the nose cone 112 into the intake section 102. Fluid passing through the intake section 102 is accelerated and pressurized. As illustrated in FIG. 1, a fraction of the fluid exhausted from the fan 114 is directed through a bypass section 118 disposed between the fan case 116 and an engine cowl 120 for generating a forward thrust. The remaining fraction of the fluid exhausted from the fan 114 is directed into the compressor section 104. One skilled in the art will appreciate that the fan 114 may be configured in other embodiments, for example as a low pressure compressor stage, such that substantially all of the fluid exhausted from the fan is directed into the compressor and not split radially into plural streams.

The compressor section 104 includes multiple compressors. The fan intake section 102 and the compressor section 104 may be collectively referred to as the compression system of the engine 100. In the depicted embodiment, the compressor section 104 includes an axi-centrifugal compressor having an axial compressor portion 122, which may include one or more axial stages, and a centrifugal compressor portion 124 downstream of the axial compressor portion 122. As presently preferred, the configuration of the compressor section 104 will provide a proportioned pressure ratio distribution across the axi-centrifugal compressor. In particular, a relatively high level of pressure rise is provided through the axial compressor portion 122, as well as on each individual axial stage. Further details concerning the preferred configuration of the compressor section 104 are disclosed in U.S. application Ser. No. 15/079,538 entitled "Axi-Centrifugal Compressor" filed on Mar. 24, 2016, which is incorporated herein by reference in its entirety.

Pressurized fluid is directed from the centrifugal compressor portion 124 into the combustion section 106 where it is mixed with fuel and combusted in an annular combustor 126. High-temperature exhaust gases are then directed into the turbine section 108. The turbine section 108 includes one or more turbines. In the depicted embodiment, the turbine section 108 includes two turbines disposed in axial flow series, a high-pressure turbine 128 and a low-pressure turbine 130. However, it will be appreciated that the number of turbines, and/or the configurations thereof, may vary, as may the number and/or configurations of various other components of the exemplary gas turbine engine 100. The high-temperature exhaust gases from the combustion section 106 expand through each turbine, causing it to rotate. The exhaust gases are discharged from the gas turbine engine 100 through a propulsion nozzle 132 disposed in the exhaust section 110, providing additional forward thrust. Rotation of the turbines 128, 130 drive one or more components in the gas turbine engine 100 via concentrically disposed shafts or spools. For example, the high-pressure turbine 128 may drive the axial compressor portion 122 and the centrifugal compressor portion 124 and via a high-pressure spool 134 and the low-pressure turbine, 130 may rotate the fan 114 about a rotational axis A via a low-pressure spool 136. As mentioned above, the gas turbine engine 100 of FIG. 1 is merely exemplary in nature, and may vary in different embodiments.

Figure 2:
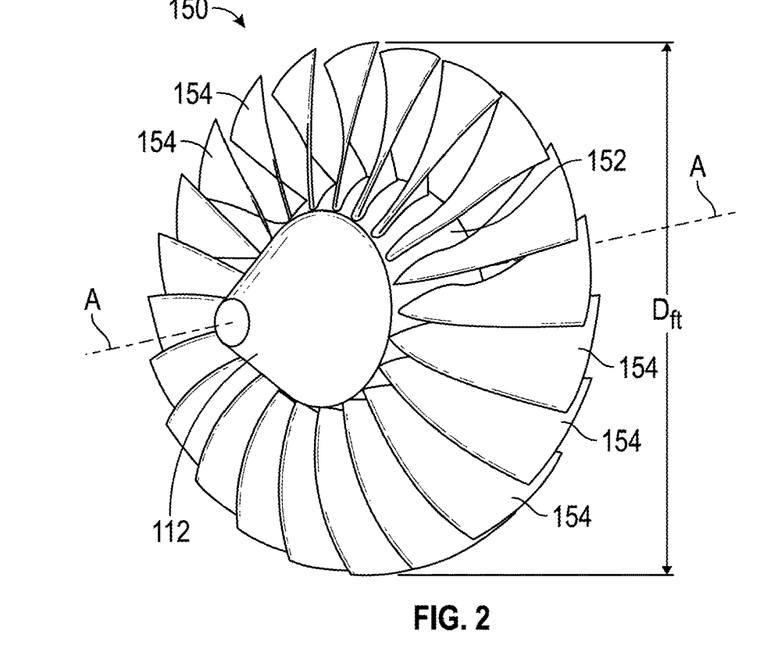
FIG. 2 is a perspective view of a blisk fan according to an embodiment of the present disclosure.

With reference now to FIGS. 1-4, the fan 114 in the intake section 102 may be a bladed disk or blisk fan 150 having a rotor hub 152 fixed for rotation about the rotational axis A to the low pressure spool 136 and a circumferential row of fan blades 154 evenly distributed about the rotor hub 152. As seen in FIG. 2, the blisk fan includes twenty-two individual blades 154 (several of which are labelled). Each fan blade 154 includes a first surface 156 and a second surface 158, which is circumferential opposite the first surface 156. Each fan blade 154 extends radially from an inner root 160 at a proximal end where the fan blade 154 intersects the rotor hub 152 to a radially outer tip 162 at a distal end. The fan blade 154 extends axially from a leading edge 164 to a trailing edge 166 of the fan blade 154. While a 22-blade fan has been illustrated herein, one skilled in the art will appreciate that the specific configuration of the blisk fan 150 including the number of blades may vary depending on the intended use and performance parameters required for a given application.

Figure 3:
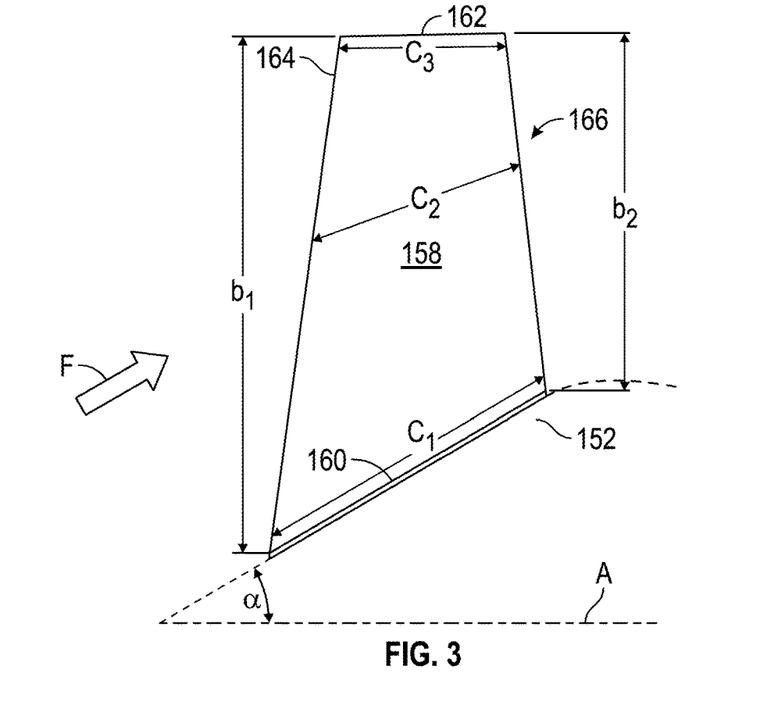
FIG. 3 is a simplified axisymmetric view of the blisk fan shown in FIG. 2.

With specific reference to FIG. 3, the geometry of the fan blade 154 defines, in part, an airfoil having a span dimension in terms of the height (e.g., $b_1$, $b_2$ . . . ) of the fan blade 154 extending radially from the inner root 160 to the outer tip 162, and a chord projection (e.g., $c_1$, $c_2$, $c_3$ . . . ) in terms of the distance from the leading edge 164 to the trailing edge 166, typically in the flow direction F. Because the airfoil will likely have radial variations and tangential variations for a given fan blade 154, it is common to refer to an average span and an average chord. The average span and average chord may be computed by averaging discrete measurements on the fan blade 154 or by geometric modeling of the airfoil in an aerodynamic/CFD computer program or by any other acceptable method known to one of skilled in the art. The geometry of the fan blade 154 may also be defined in term of an aspect ratio (AR) which may be defined by the product of the average span and the average chord or by geometric modeling of the airfoil in an aerodynamic/CFD computer program or by any other acceptable method known to one of skilled in the art.

The first surface 156 is referred to as the suction side, which is generally convex and associated with higher velocity and lower static pressure. The second surface 158 is referred to as the pressure side, which is generally concave and associated with a comparatively lower velocity and higher static pressure relative to the suction surface. As the blisk fan 150 rotates, ambient fluid F is drawn over the fan blades 154 from the leading edge 164 to the trailing edge 166, accelerated and compressed by the airfoil and directed through the compressor section 104 or the bypass section 118. The fan blades 154 are shown as being integrally formed with the rotor hub 152 in a single-piece blisk fan 150. However, one skilled in the art should appreciate that the present disclosure will encompass a blisk fan having blades, which are separately formed from but materially joined to the rotor hub in any conventional manner.

When configured for use in gas turbine propulsion systems associated with regional and business aviation applications, or in other turbofan, turbojet, turboshaft, turboprop and rotorcraft applications (e.g., less than 15 klbf Sea Level Take Off Thrust), the leading edge tip diameter ($D_{fi}$) of the blisk fan 150 is less than 48 inches, and preferably in the range between 28 inches and 48 inches (about 700 mm and 1200 mm). A balanced pressure rise and enhanced integration associated with the compression system (i.e., the blisk fan 150 and the compressor section 104) may be achieved by relating the fan leading edge tip diameter ($D_{fi}$) and the impeller exit tip diameter ($D_{it}$) of the centrifugal compressor section 124. In particular, a balanced pressure rise and integration of the blisk fan 150 and the compressor section 104 (i.e., the compression section) is achieved when a balance factor, which is defined as the quotient of the fan leading edge tip diameter and the exit tip diameter, is greater than 1.9 and less than 3.2 ($1.9 < D_{fi}/D_{it} < 3.2$). In configurations where the impeller exit tip diameter is not constant across the blade height, the maximum impeller exit tip diameter can used to compute a balance factor.

The fan blades 154 have an aspect ratio (AR) which is greater than 1.2, and preferably greater than 1.5. The fan blades 154 are further configured so that the velocity of the outer tip 162 of the fan blades 154 (i.e., the tangential tip speed) is between about 1300 ft/sec and 1550 ft/sec (about 400 m/s and 480 m/s) when the blisk fan 150 is rotated at its maximum rotational speed. Furthermore, the annular portion of the rotor hub 152, which provides an airflow surface between the fan blades 154, may have a rotor hub slope (a) that is equal to or greater than 20 degrees with respect to the rotational axis. In this regard, a rotor hub 152 having a hub slope greater than twenty degree enables a relatively high pressure rise across the blisk fan 150 unique to this type of gas turbine propulsion system.

It is well known that a blisk fan 150, and in particular the fan blades 154 may vibrate during the operation of the gas turbine engine 100. Such vibrations may be classified as free vibrations, which take place when the fan blade 154 oscillates under the action of forces inherent within the dynamical system, or forced vibrations that take place under the excitation of forces external to the dynamical system. Under free vibration, the fan blade 154 may vibrate at a "natural frequency" based on the mass and stiffness distribution in the blisk fan 150. The blisk fan 150 including the rotor hub 152 and the fan blades 154 represents a continuous system (as compared to a discrete system), and will have multiple natural frequencies. The term "mode shape" refers to the deflected shape of the component corresponding to vibratory deflection of a given natural frequency. The term "natural mode" or simply "mode" refers collectively to a particular natural frequency and mode shape, and is typically identified in ascending numerical order from the lowest natural frequency to the highest natural frequency. The natural modes of vibration are based on the bending stiffness and torsional stiffness of the blisk fan 150, as well as the mass distribution or moment of inertias thereof.

Figure 4:
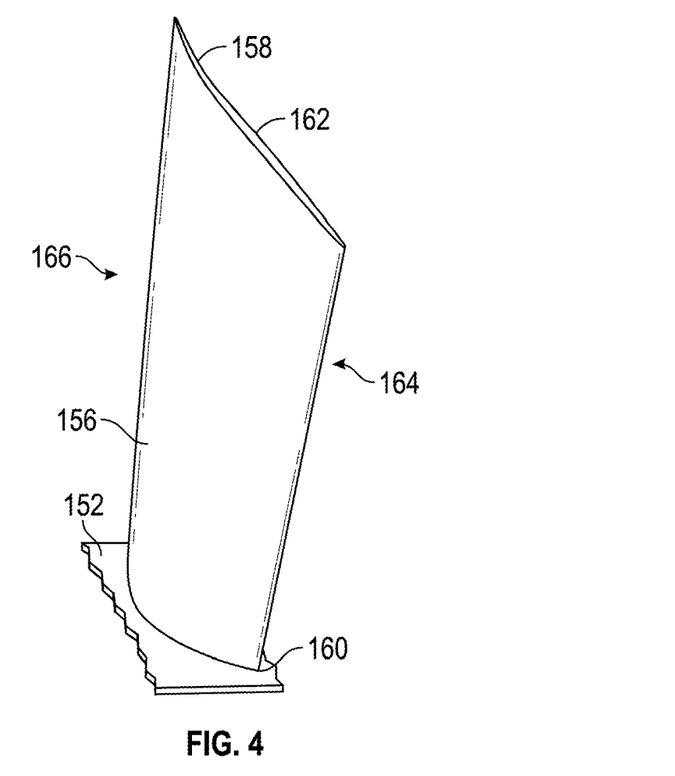
FIG. 4 is a perspective view of an isolated fan blade on the blisk fan.

As indicated above, a fan blade 154 has multiple vibratory modes at specific natural frequencies. In the exemplary embodiment illustrated, the first vibratory mode is best described as a flexural mode (i.e., flexing in a direction generally transverse to the first and second surfaces 156, 158). In this first vibratory mode, a node of zero vibratory displacement occurs at the inner root 160, and the outer tip 162 experiences the greatest displacement such that the fan blade 154 oscillates like a simple cantilever. The second vibratory mode is also a flexural mode having a first node of zero vibratory displacement at the inner root 160 and a second node of zero vibratory displace radially outward between the inner root 163 and the outer tip 162. In the second vibratory mode there is opposite flexural displacement of the fan blade 154 above and below the second node. The third vibratory mode is a torsional mode where the fan blade 154 oscillates or twists about a radial or span axis.

There is a node of zero vibratory displacement at the inner root 160 and the outer tip 162 experiences the greatest rotation. The associated natural frequencies for these first three modes increase in magnitude from the first mode to third mode, with each mode occurring at a discrete natural frequency. Additional higher order modes of vibration are known which occur at even higher natural frequencies but require higher energy for excitation.

Under forced vibration, an excitation force causes the blisk fan 150 to vibrate at an excitation frequency. In the case of the fan blades 154, the excitation sources are typically generated by aerodynamic excitation forces acting on the first and second surfaces 156, 158 or by rotational excitation forces from the rotor hub 152. As such, the frequencies of these excitation forces are related to the fan speed in revolutions per second and can be described in terms of its "order." An "order" represents a normalization of the rotational speed. The first order is the rotational speed, and the $n^{th}$ order is n times the rotational speed. In particular, the frequency of the first fan order equals the rotational speed of the blisk fan 150 and the frequency of the second order equals twice the rotational speed thereof. If the frequency of this excitation force coincides with one of the natural frequencies of the fan blades 154, a condition of resonance will be encountered and relatively large oscillations of the fan blades 154 may result.

Figure 5:
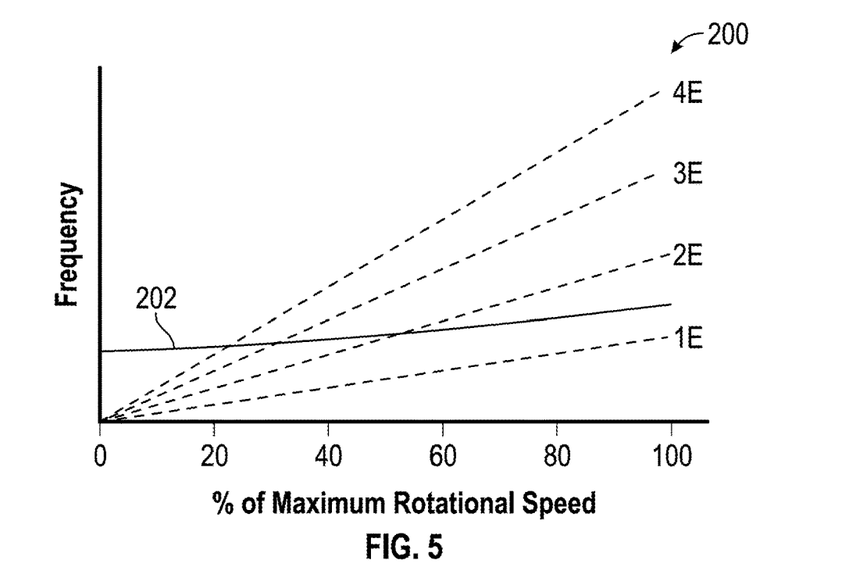
FIG. 5 is a graph illustrating the relationship between the first vibratory mode of the fan blade and the rotational speed of the blisk fan in terms of fan order.

In accordance with the present disclosure, the bending stiffness and mass distribution of the fan blades 154 are configured such that modal characteristics of the blisk fan 150 avoids crossing of the first engine order throughout the range of rotational speed in these lower powered gas turbine propulsion systems. In particular, the natural frequency associated with the first vibratory mode (i.e., the first flexural mode) is greater than the first fan order throughout the operating range, and is between the first and second fan orders at the maximum rotational speed of the blisk fan 150. The graph 200 reproduced at FIG. 5 illustrates this relationship where the natural frequency of the first flexural mode of the fan blades 154 represented by line 202 is greater than the frequency of the first fan order throughout the operating range, and is between the frequencies of the first and second fan order at the maximum rotational speed of the blisk fan 150. For example, if the maximum rotational speed of the blisk fan 150 is 4000 rev/min, the first fan order frequency at max rpm would be about 67 Hz and the second order frequency would be about 133 Hz. Thus, the bending stiffness and mass distribution of the fan blades would be configured to ensure that the first vibratory mode of the fan blades 154 fell within the range of 67-133 Hz. Inherent dampening within the blisk fan 150 may also be incorporated to influence the natural frequency and limit the magnitude of oscillations by dissipating some of this vibratory energy.

Depending on the specific application, the fan blade 154 may include various structural and or material configurations to meet the size, aspect ratio, speed and frequency constraints set forth above. As noted above, the bending and torsional stiffness, the dampening and the mass distribution of the fan blades 154 define the modal characteristics thereof. As such, metal fan blades may incorporate high-strength super-alloy metals, or hybrid fan blades may incorporate a metal framework with weight-reducing voids filled by suitable filler materials. Additionally or alternatively, the fan blades may include certain internal structural reinforcements and/or voids for properly tuning the modal characteristics of the fan blades. In this regard, modern analytical tools may be used to perform detailed fan blade optimization to ensure the design is robust to all requirements (flutter, stress, weight, soft FOD ingestion, etc.), while maintaining the relatively high tip speed and high hub slope described herein.

In one embodiment, the blisk fan 150 may be a tuned blisk fan such that the modal characteristics of each fan blade 154 are tuned to the same baseline natural frequency associated with the first vibratory mode, which is between the first and second order at the maximum rotational speed of the blisk fan 150. In an alternate embodiment, the blisk fan 150 may be an intentionally mistuned blisk fan such that the modal characteristic of the fan blades 154 are intentionally mistuned between a baseline natural frequency and one or more offset natural frequencies that are offset from the baseline natural frequency. For example, the blisk fan 150 shown in FIG. 2 which has 22 fan blades 154, may be a mistuned blisk fan such that the odd numbered blades (1, 3, 5, etc.) are tuned at the baseline natural frequency and the even numbered blades are tuned at an offset natural frequency. In the case of a mistuned blisk fan, the baseline natural frequency and the offset natural frequency associated with the first vibratory mode are both between the first and second order at the maximum rotational speed thereof. While the alternate embodiment described above provides a mistuned blisk fan having a simple alternating pattern for mistuning, one skilled in the art should appreciate that that other patterns for mistuning may be adapted based on the specific configuration, application and operational requirements of the blisk fan.

The present disclosure provides specific structural elements and functional considerations to achieve a light weight blisk fan which may be readily incorporated into a gas turbine propulsion system typically used in regional and business aviation applications as well as in other turbofan, turbojet, turboshaft, turboprop and rotorcraft applications (e.g., less than 15 klbf Sea Level Take Off Thrust) such that all performance, weight, durability and cost criteria are simultaneously achieved. Although the present embodiment has been depicted and described as being implemented in a blisk fan for the fan section of a turbofan gas turbine jet engine, it will be appreciated that the teachings provided herein may be implemented in various other sections and in various types of turbomachines having rotationally periodic (i.e., cyclically symmetric) components that are susceptible to vibratory excitation. Exemplary rotationally periodic components may be included in a fan section, a compressor section or a turbine section of a gas turbine engine, or alternately in rotatable components of a turbocharger, a pump, a fan, etc.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless explicitly described otherwise. The sequence of the text in any of the claims does not imply that process steps must be performed in a temporal or logical order according to such sequence unless the language of the claim specifically defines a sequence. Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A compression system for a turbine engine propulsion system comprising:
   an axi-centrifugal compressor including an axial compressor section having a compressor inlet and a centrifugal compressor section having a compressor outlet;
   a blisk fan positioned upstream of the axi-centrifugal compressor for directing at least a portion of a pressurized fluid stream to the compressor inlet, the blisk fan having a rotor hub configured to rotate about a rotational axis at a maximum rotational speed, and a plurality of blades materially joined with the rotor hub and extending radially outward from the rotor hub to define a fan leading edge tip diameter, wherein each of the plurality of blades has a first vibratory mode at a natural frequency which is greater than a first fan order and less than a second fan order at the maximum rotational speed; and
   wherein a balance factor of the compression system is between 1.9 and 3.2.

2. The compression system according to claim 1, wherein each of the plurality of blades intersects the rotor hub at a proximal end and extends radially from an inner root to an outer tip at a distal end and axially from a leading edge to a trailing edge, each of the plurality of blades comprising an airfoil having an aspect ratio not less than 1.2.

3. The compression system according to claim 2, wherein the aspect ratio of each airfoil is not less than 1.5.

4. The compression system according to claim 1, wherein the rotor hub comprises an annular portion providing an airflow surface between the plurality of blades, the airflow surface having a hub slope that is not less than 20 degrees with respect to the rotational axis.

5. The compression system according to claim 1, wherein each of the plurality of blades intersects the rotor hub at a proximal end and extends radially from an inner root to an outer tip at a distal end such that a tangential tip speed of the outer tip is between 1300 ft/sec and 1550 ft/sec at the maximum rotational speed.

6. The compression system according to claim 1, wherein each of the plurality of blades further comprises a first surface and a second surface opposite the first surface, and wherein the first vibratory mode comprises a first flexural mode flexing in a direction transverse to the first and second surfaces.

7. The compression system according to claim 1, wherein the plurality of blades comprises at least a first set of blades having a first natural frequency for the first vibratory mode thereof and a second set of blades having a second natural frequency for the first vibratory mode thereof, wherein the second natural frequency is offset from the first natural frequency, wherein the first and second natural frequencies are greater than the first fan order and less than the second fan order at the maximum rotational speed.

8. The compression system according to claim 7, wherein the number of blades in the first and second set of blades is equal and alternately distributed on the rotor hub.

9. The compression system according to claim 1, wherein the fan leading edge tip diameter is not greater than 48 inches.

10. A propulsion system, comprising:
    a turbine engine disposed in an engine cowl and operably coupled to a shaft assembly for rotation about a rotational axis, the turbine engine having an axi-centrifugal compressor including an axial compressor section having a compressor inlet and a centrifugal compressor section having a compressor outlet;
    a fan section disposed in the engine cowl upstream of the axi-centrifugal compressor and operably coupled to the shaft assembly for drawing a fluid into the engine cowl and directing at least a portion of a pressurized fluid stream into the compressor inlet, the fan section including a rotor hub configured to rotate about the rotational axis at a maximum rotational speed, and a plurality of blades materially joined with the rotor hub and extending radially outward from the rotor hub to define a fan leading edge tip diameter, wherein each of the plurality of blades has a first vibratory mode at a natural frequency which is greater than a first fan order and less than a second fan order at the maximum rotational speed; and
    wherein a balance factor of the fan section and axi-centrifugal compressor is between 1.9 and 3.2.

11. The propulsion system according to claim 10 wherein the fan leading edge tip diameter is not greater than 48 inches.

12. The propulsion system according to claim 10, wherein each of the plurality of blades intersects the rotor hub at a proximal end and extends radially from an inner root to an outer tip at a distal end and axially from a leading edge to a trailing edge, each of the plurality of blades comprising an airfoil having an aspect ratio not less than 1.2.

13. The propulsion system according to claim 12, wherein the aspect ratio of each airfoil is not less than 1.5.

14. The propulsion system according to claim 11 wherein the rotor hub comprises an annular portion providing an airflow surface between the plurality of blades, the airflow surface having a hub slope that is not less than 20 degrees with respect to the rotational axis.

15. The propulsion system according to claim 10, wherein each of the plurality of blades intersects the rotor hub at a proximal end and extends radially from an inner root to an outer tip at a distal end such that a tangential tip speed of the outer tip is between 1300 ft/sec and 1550 ft/sec at the maximum rotational speed.

16. The propulsion system according to claim 10, wherein each of the plurality of blades further comprises a first surface, a second surface opposite the first surface and the first vibratory mode comprises a first flexural mode flexing in a direction transverse to the first and second surfaces.

17. The propulsion system according to claim 10, wherein the plurality of blades is divided into a first set of blades having a first natural frequency for the first vibratory mode thereof and a second set of blades having a second natural frequency for the first vibratory mode thereof, wherein the second natural frequency is offset from the first natural frequency, wherein the first and second natural frequencies are greater than the first fan order and less than the second fan order at the maximum rotational speed.

18. The propulsion system according to claim 16, the number of blades in the first and second set of blades is equal and alternately distributed on the rotor hub.

19. The propulsion system according to claim 10, further comprising a nose cone secured to the rotor hub upstream of the plurality of blades.

20. A propulsion system, comprising:
a turbine engine disposed in an engine cowl and operably coupled to a shaft assembly for rotation about a rotational axis, the turbine engine having an axi-centrifugal compressor including an axial compressor section having a compressor inlet and a centrifugal compressor section having a compressor outlet; and
a fan section disposed in the engine cowl upstream of the axi-centrifugal compressor and operably coupled to the shaft assembly for drawing a fluid into the engine cowl and directing at least a portion of a pressurized fluid stream into the compressor inlet, the fan section including a rotor hub configured to rotate about the rotational axis at a maximum rotational speed and having an annular portion, and a plurality of blades materially joined to the rotor hub, each blade intersecting the annular portion of the rotor hub at a proximal end to define an airflow surface having a hub slope that is not less than 20 degrees with respect to the rotational axis and extending radially from an inner root to an outer tip at a distal end to define a fan leading edge tip diameter, each blade extending axially from a leading edge to a trailing edge to define an airfoil having an aspect ratio not less than 1.2;
wherein each blade has a first vibratory mode at a natural frequency which is greater than a first fan order and less than a second fan order at the maximum rotational speed; and
wherein a balance factor of the fan section and axi-centrifugal compressor is between 1.9 and 3.2.

* * * * *